US006996108B1

(12) United States Patent
Budhraja (10) Patent No.: US 6,996,108 B1
(45) Date of Patent: Feb. 7, 2006

(54) METHOD AND APPARATUS FOR SWITCHING AND MANAGING BANDWIDTH FOR CROSS-CONNECTION

(75) Inventor: Virendra K. Budhraja, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 625 days.

(21) Appl. No.: 10/007,348

(22) Filed: Nov. 7, 2001

Related U.S. Application Data (63) Continuation of application No. 09/208,626, filed on Dec. 8, 1998, now Pat. No. 6,324,185.

(51) Int. Cl.
*H04L 12/56* (2006.01)

(52) U.S. Cl. .............................. 370/395.41; 370/395.1

(58) Field of Classification Search ................ 370/229, 370/235, 395.1, 395.2, 395.21, 395.4, 395.41, 370/395.42, 395.43, 395.7, 395.71, 412, 370/420

See application file for complete search history.

(56) References Cited

U.S. PATENT DOCUMENTS

| | | | |
|---|---|---|---|
| 5,166,927 A | 11/1992 | Iida et al. ..................... | 370/238 |
| 5,274,635 A | 12/1993 | Rahman et al. ............ | 370/60.1 |
| 5,483,522 A | 1/1996 | Derby et al. ................. | 370/400 |
| 5,627,971 A | 5/1997 | Miernik ....................... | 370/238 |
| 5,777,988 A | 7/1998 | Cisneros ..................... | 370/238 |
| 5,790,546 A | 8/1998 | Dobbins et al. ............ | 370/400 |
| 5,940,372 A | 8/1999 | Bertin et al. ................. | 370/238 |
| 6,141,318 A | 10/2000 | Miyao ......................... | 370/217 |

OTHER PUBLICATIONS

"Digital Interface Between the SLC®96 Digital Loop Carrier System And A Local Digital Switch," Technical Reference TR-TSY-000008, Issue 2, Aug., 1987, Revision 1, Sep., 1993, *Bellcore*.

"Functional Criteria for Digital Loop Carrier Systems," A Module of TSGR, FR-NWT-000440, Technical Reference TR-NWT-000057, Issue 2, Jan., 1993, *Bellcore*.

"Integrated Services Digital Network (ISDN) Overall Network Aspects and Functions Functional Architecture of Transport Networks Based on ATM," ITU-T Recommendation 1.326, *International Telecommunication Union*, Nov., 1995, 23 pages.

"Integrated Digital Loop Carrier System Generic Requirements, Objectives, and Interface," (A module of TSGR, FR-440), Generic Requirements GR-303-CORE, Issue 2, *Bellcore*, Dec. 1998.

*Primary Examiner*—Dang Ton
*Assistant Examiner*—Phuc Tran
(74) *Attorney, Agent, or Firm*—Baker Botts L.L.P.

(57) ABSTRACT

An ATM/TDM cross-connection in a digital loop carrier (DLC) network providing switching and bandwidth management facilities. TDM traffic is encapsulated in ATM cells and transported from network terminations to subscriber terminations in a digital loop via a plurality of digital loop carrier switching systems (DLCSSs). The DLCSSs are configured such that TDM traffic encapsulated in ATM cells may be transported from the network termination to the subscriber termination without having to perform TDM switching at the intermediate DLCSSs.

20 Claims, 7 Drawing Sheets

METHOD AND APPARATUS FOR SWITCHING AND MANAGING BANDWIDTH FOR CROSS-CONNECTION

CROSS REFERENCE TO RELATED APPLICATIONS

This application is a continuation of U.S. application Ser. No. 09/208,626, filed Dec. 8, 1998 now U.S. Pat. No. 6,324,185, by Virendra K. Budhraja and entitled "Method and Apparatus for Switching and Managing Bandwidth in an ATM/TDM Network Cross-Connect."

BACKGROUND OF THE INVENTION

This invention relates to digital loop carrier (DLC) technology and in particular to techniques for cross-connecting ATM and TDM networks having subscriber terminations and network terminations. More particularly, the invention relates to ATM/TDM cross-connection techniques in a particular class of networks employing a plurality of multi-service digital local loop switching systems, such as B-32 switches manufactured by Fibex Systems of Petaluma, Calif.

Time division Multiplex (TDM) traffic can be carried in Asynchronous Transfer Mode (ATM) in certain portions of a standard transport network. Heretofore, routing such traffic has required that the TDM traffic datagrams be routed at each switching node within the ATM network. Further, it was required that a virtual path identifier/virtual circuit identifier pair for an ATM circuit (VPI/VCI) for each ATM cell be provided for each path at the time of attempted cross connect. As a result of the above, establishing cross-connections between ATM and TDM networks is usually a slow and resource-intensive process. It is desirable to reduce the amount of switching and delay in a network with multiple intermediate nodes.

Thus, there is a need for a system and method which provides a better and efficient mechanism for establishing a digital cross-connection between ATM networks and TDM networks, and which reduces the processing and time overhead associated with switching ATM and TDM traffic in the cross-connection.

SUMMARY OF THE INVENTION

According to the present invention, a system and method are disclosed for cross-connecting ATM and TDM networks by provisioning a network connection between a network terminal and a subscriber terminal in a digital loop carrier network comprising a plurality of digital loop carrier switching systems (DLCSSs). The DLCSSs may be configured such that the TDM traffic encapsulated in ATM cells may be transported from the network termination to the subscriber termination without having to perform TDM switching at the intermediate DLCSSs.

According to another aspect of the present invention, to facilitate bandwidth management for the network, the DLCSSs maintain bandwidth maps for each of their links. The bandwidth maps define the bandwidth and switching characteristics for the DLCSS links. The bandwidth maps enable switching of ATM cells carrying the TDM payload without having to perform TDM switching at the intermediate DLCSSs.

According to yet another aspect of the present invention, ATM cells for carrying TDM traffic are allocated according to information stored in the bandwidth maps. All the DS-0s in an ATM cell are allocated to the same destination which obviates the need to perform TDM switching at the intermediate network nodes.

According to still another aspect of the present invention, a network managing station is provided to facilitate provisioning of the ATM/TDM cross connection. The network managing station may be configured to determine the network route between the network termination and the subscriber termination to provision the DLCSSs and links in the network route.

BRIEF DESCRIPTION OF THE DRAWINGS

Additional objects and features of the invention will be more readily apparent from the following detailed description and appended claims when taken in conjunction with the drawings, in which:

DESCRIPTION OF THE SPECIFIC EMBODIMENTS

Figure 1:
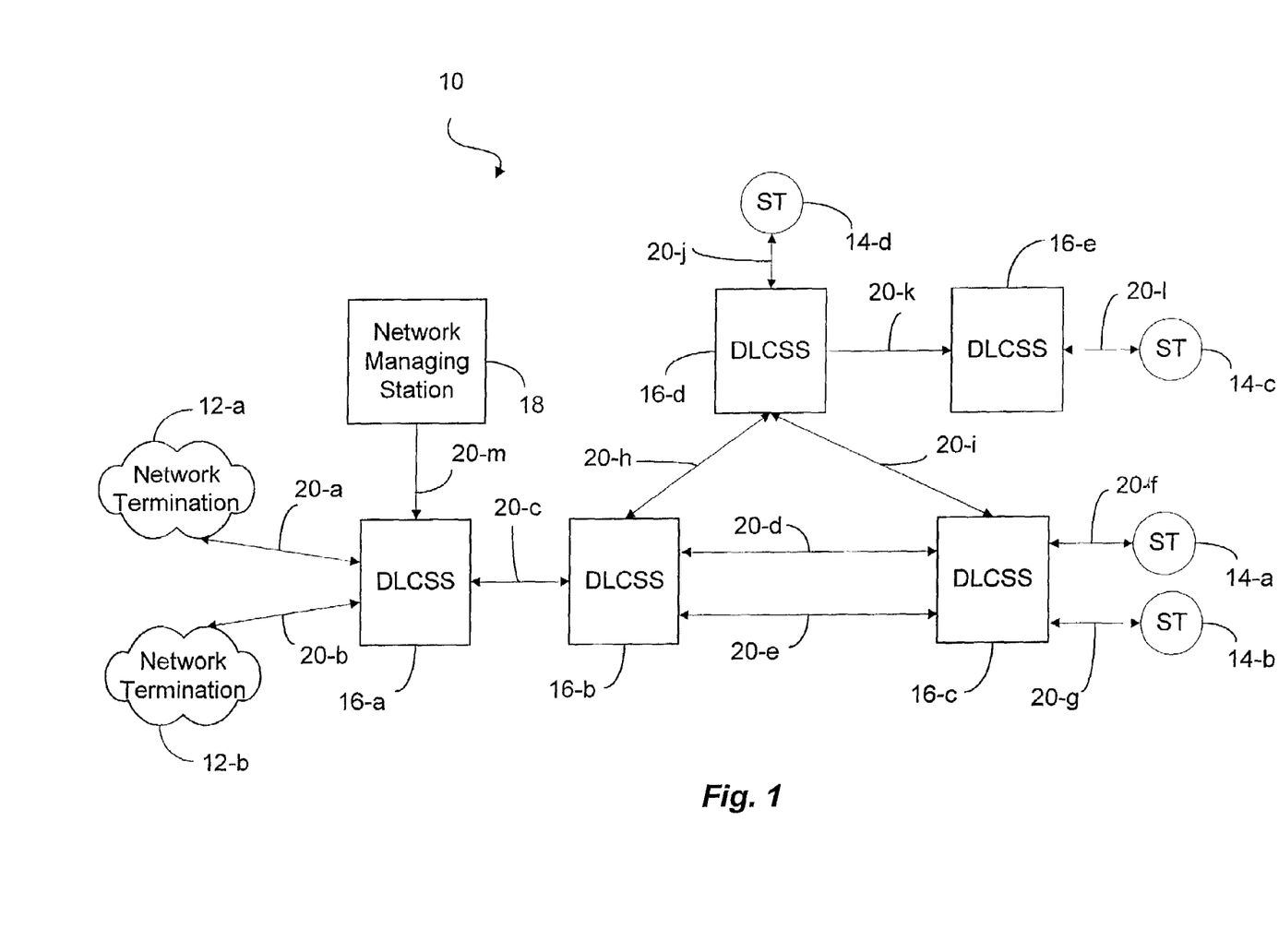
FIG. 1 is a high level block diagram of a DLC network according to an embodiment of the invention.

The present invention is a system and method for establishing cross-connections between TDM and ATM networks and providing switching and bandwidth management facilities for the TDM/ATM cross-connection in a digital loop carrier (DLC) network. FIG. 1 is a high level block diagram of a DLC network 10 comprising a plurality of multi-service digital local carrier switching systems (DLCSS) 16-a, 16-b, 16-c, 16-d, 16-e, one or more network terminations 12-a, 12b coupled to DLCSS 16-a, one or more subscriber terminations 14-a through 14-d coupled to one or more DLCSSs 16, and at least one network managing station (NMS) 18 coupled to a DLCSS 16-a. The various components are coupled to each other via network links 20-a through 20-m. As shown in FIG. 1, network terminations 12-a and 12-b may be coupled to subscriber terminations 14-a through 14-d to provide network based services to the subscribers.

The network shown in FIG. 1 may be any standard transport network such as a Synchronous Optical network (SONET) or an ATM network. Network terminations 12-a and 12-b as shown in FIG. 1 may include analog line terminations providing analog connection pairs, DS-0 channel terminations providing DS-0 based network connections, DS-1 line terminations providing D1 based network connections, Integrated Services digital Network (ISDN) Basic Rate Interface (BRI) line terminations providing universal BRI connections, ISDN quarter DS-0 channel terminations providing QDS-0 connections, XDSL line terminations, DS-1 UNI terminations providing DS-1 UNI services, OC-3 UNI terminations providing OC-3 UNI services, DS-1 circuit emulation terminations providing DS-1 CES, or any other similar terminations known to those of ordinary skill in the art. The network connections 20-*a* and 20-*b* may themselves be physical interfaces, for example, a DS-1 line interface to a Class-5 switch, or may be part of a bigger network pipe, for example, a DS-0 channel termination which is part of a DS-1 line termination.

The present invention supports a wide variety of subscriber terminations such as analog line terminations providing DS-0 based analog services such as POTS, E&M, etc., ISDN BRI line terminations providing ISDN BRI services such as 2B+D service, ISDN DS-0 channel terminations providing ISDN B channel services, ISDN quarter DS-0 channel terminations for subscriber signaling, DS-1 line terminations providing TDM DS-1 services, ISDN PRI line terminations providing ISDN PRI services such as 23B+D service, XDSL line terminations, DS-1 UNI terminations providing DS-1 UNI services, OC-3 UNI terminations providing OC-3 UNI services, DS-1 circuit emulation terminations providing DS-1 CES, or any other similar terminations known to those of ordinary skill in the art. Table 1 shows some of the valid cross-connections which may possibly be made between network terminations 12-*a*, 12-*b* and subscriber terminations 14-*a*, 14-*b*, 14-*c*, and 14-*d*.

TABLE 1

| Network Terminations | Subscriber Terminations | Services supported |
| --- | --- | --- |
| DS-0 channel | Analog line | TR008 services |
| Analog line | Analog line | Universal analog services |
| DS-0 channel | DS-0 channel | ISDN services |
| QDS-0 channel | QDS-0 channel | ISDN signaling |
| DS-1 line | DS-1 line | DS-1 link and services |
| XDSL line | XDSL line | XDSL services |
| DS-1 UNI | DS-1 UNI | DS-1 UNI services |
| OC-3 UNI | OC-3 UNI | OC-3 UNI services |

Multi-service DLCSSs 16 are primarily responsible for establishing a cross-connection between ATM and TDM networks and for providing switching and bandwidth management services for the cross-connection. Based on the location of a DLCSS within the network topology, a DLCSS may be classified as a "network" DLCSS, an "intermediate"DLCSS, or a "subscriber" DLCSS. A "network" DLCSS is one which interfaces with at least one network termination. For example, in FIG. 1, DLCSS 16-*a* which interfaces with network terminations 12-*a* and 12-*b* may be classified as a network DLCSS. In addition to a network termination interface, a network DLCSS may also have interfaces to subscriber terminations. A "subscriber" DLCSS is one which interfaces with at least one subscriber termination but does not interface with a network termination. For example, DLCSSs 16-*c*, 16-*d*, and 16-*e* which interface with subscriber terminations 14-*a* and 14-*b*, 14-*d*, and 14-*e*, respectively, may be referred to as subscriber DLCSSs. DLCSSs which are neither network DLCSSs nor subscriber DLCSSs are classified as intermediate DLCSSs. For example, DLCSS 16-*b* may be referred to as an intermediate DLCSS. It should be noted that the classification of DLCSSs as described above is solely for the purpose of explaining the working of the present invention and should not be construed in any manner to limit the scope of the present invention.

In a specific embodiment, NMS 18 allows a network administrator to provision the network to support the ATM/TDM cross-connection. NMS 18 is typically coupled with a network DLCSS, such as 16-*a*. Functions performed by NMS 18 include but are not restricted to: network configuration, configuring the DLCSSs and their associated links to establish a connection between a network termination and a subscriber termination, network management functions, and monitoring and logging of alarms or errors raised within the network.

Figure 2:
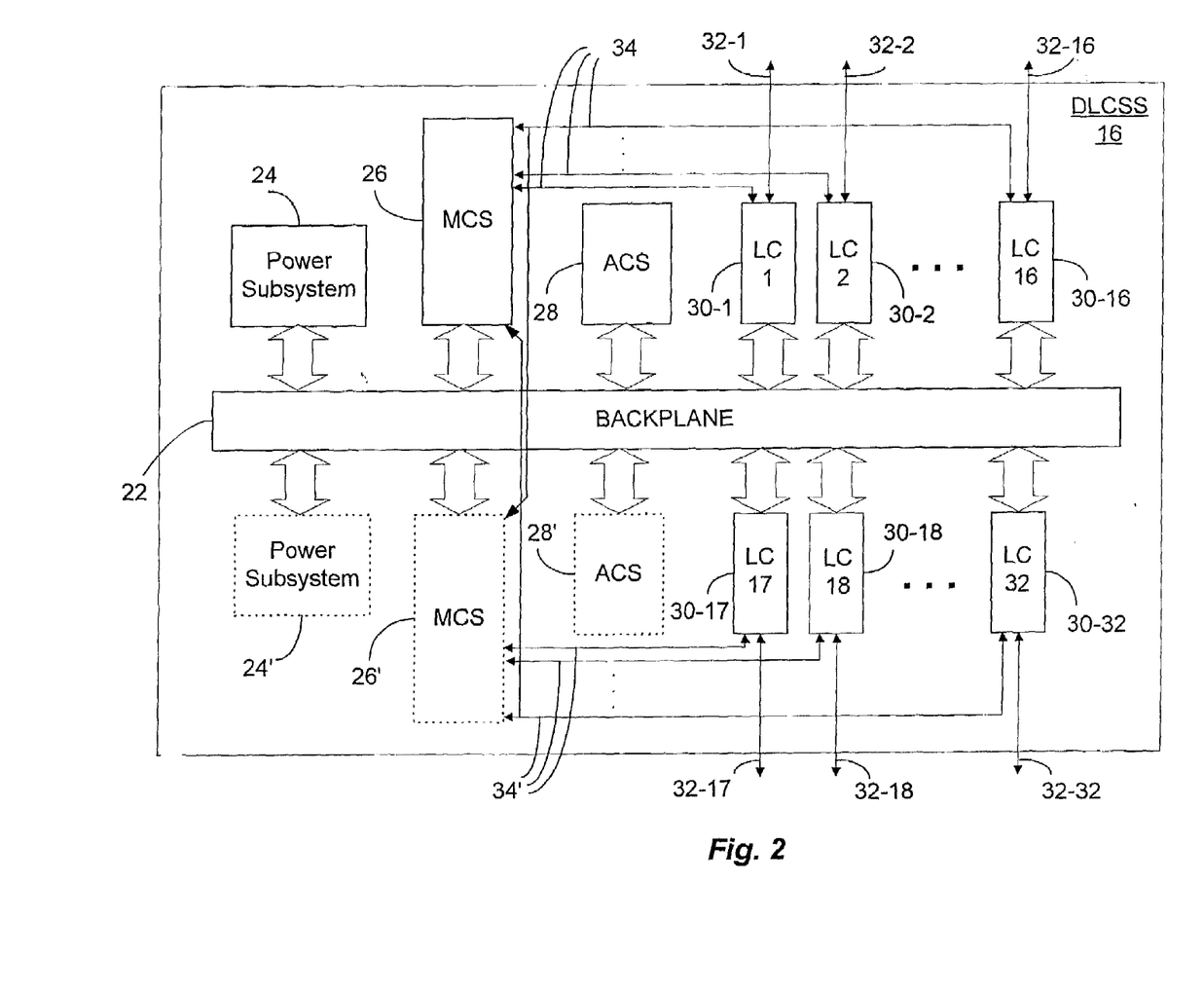
FIG. 2 is a block diagram of a multi-service digital loop carrier switching system (DLCSS) according to an embodiment of the invention.

FIG. 2 illustrates a specific embodiment of DLCSS 16. As shown in FIG. 2, DLCSS 16 comprises a plurality of components and subsystems connected to a backplane 22. Backplane 22 provides a mechanism for letting the various components and subsystems of DLCSS 16 communicate with each other as intended. The subsystems may include a power subsystem 24, a main controller subsystem (MCS) 26, an advanced controller subsystem (ACS) 28, and a plurality of line cards (LCs) 30-1 through 30-16. In a specific embodiment, a redundant set of subsystems 24', 26', and 28' may also provided to back up the primary subsystems. An additional set of line cards 30-17 through 30-32 may also be provided to increase the bandwidth capacity of DLCSS 16. When a redundant set of subsystems is provided, each line card is directly coupled both to primary MCS 26 and to redundant MCS 26'.

Power subsystem 24 provides power to the subsystems of DLCSS 16. MCS 26 is primarily responsible for establishing the ATM/TDM cross-connection and for providing switching and bandwidth management services for the cross-connection. ACS 28 is responsible for providing advanced network related functions such as supporting high capacity ATM switches which may support bandwidhths in excess of 10 Gigabit, supporting frame relay switches and IP switching.

In a specific embodiment, line cards 30-1 through 30-16 (and 30-17 through 30-32 of the additional LCs) may be configured to couple DLCSS 16 to other components of the network via links 32-1 through 32-32. The other components of the network may include other DLCSSs, network terminations, subscriber terminations, or network managing stations. In a specific embodiment, each line card is directly coupled to MCS 26 via connections 34. In embodiments which support redundant subsystems, the line cards may be coupled to both primary MCS 26 and to the redundant MCS 26'. A line card link may either carry incoming traffic from external network components to DLCSS 16 (ingress), or may alternatively carry outgoing network traffic from DLCSS 16 to external network components (egress). Connections 34 facilitate the transfer of incoming network traffic from the line cards to MCS 26, and transfer of outgoing traffic from MCS 26 to external network components after switching and bandwidth management has been performed by MCS 26.

Figure 3:
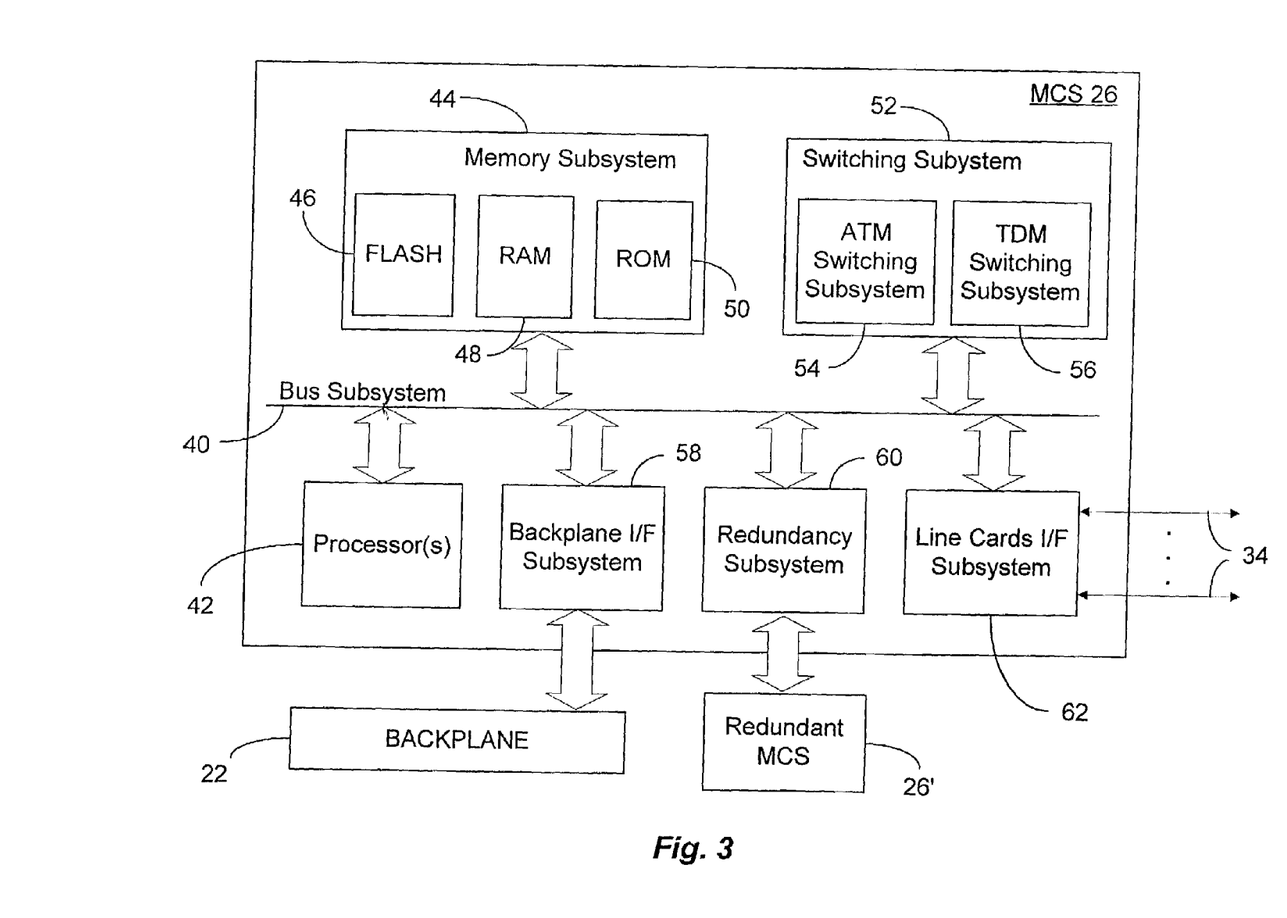
FIG. 3 is a block diagram of the main control subsystem which is contained within a DLCSS according to an embodiment of the invention.

FIG. 3 illustrates a specific embodiment of MCS 26. MCS 26 is primarily responsible for providing switching and bandwidth management functions to support the ATM/TDM cross-connection. As shown in FIG. 3, MCS 26 includes at least one processor 42 which communicates with a number of peripheral subsystems via bus subsystem 40. These peripheral subsystems typically include a memory subsystem 44, a switching subsystem 52, a line cards interface subsystem 62, a backplane interface subsystem 58, and optionally a redundancy subsystem 60.

Bus subsystem 40 provides a mechanism for letting the various components and subsystems of MCS 26 communicate with each other as intended. Bus subsystem 40 is shown schematically as a single bus, but a typical system may have a number of buses such as a local bus and one or more expansion buses as well as serial and parallel ports.

Memory subsystem 44 stores the various data constructs and programming modules that provide the functionality of MCS 26. Memory subsystem 44 typically includes a number of memories including a main random access memory (RAM) 48 for storage of instructions and data during program execution, a read only memory (ROM) 50 in which fixed instructions are stored, and a FLASH memory 46 which stores a mirror image of the various programming module images and databases stored in RAM 48. FLASH memory 46 thus provides persistent storage of the contents of RAM 48 and prevents the RAM contents from being lost due to loss of power to RAM 48. In a specific embodiment, a background process initiated by MCS 26 copies contents of RAM 48 to FLASH memory 46 while a foreground process continues to perform processing based on the contents of RAM 48. Memory subsystem 44 may store both static data and dynamic data. Static data is generally data related to the provisioning of the DLCSS by NMS 18 and does not change until the DLCSS is re-provisioned by NMS 18. Dynamic data may change during the operation of the network depending on the status of various hardware and software components within network system 10.

Switching subsystem 52 may comprise an ATM switching subsystem 54 and a TDM switching subsystem 56 and performs ATM/TDM cross-connection switching functions. Line cards interface subsystem 62 provides linkage for each of the line card links 32-1 through 32-32. MCS 26 receives incoming network traffic via these links, performs switching of the incoming network traffic, and transfers the network traffic to outgoing links for transportation to other components of the network.

Backplane interface subsystem 58 provides a mechanism for connecting MCS 26 to backplane 22. Backplane interface subsystem 58 may also be configured to handle communication of information/signals between MCS 26 and the other subsystems of DLCSS 16 via backplane 22.

In a specific embodiment which provides redundant subsystems, a redundancy subsystem 60 is provided for interfacing primary MCS 26 with redundant MCS 26'. Redundancy subsystem 60 may be configured to manage switchover operations from primary MCS 26 to redundant MCS 26' when primary MCS 26 is disabled.

In order to establish a cross-connection between a network termination and a subscriber termination, for example between network termination 12-a and subscriber termination 14-a in FIG. 1, the egress and ingress links of all DLCSSs in the path between network termination 12-a and subscriber termination 14-a have to be configured to support the cross-connection. To facilitate the cross-connection, each DLCSS maintains a bandwidth map for each of its links. The bandwidth map defines the bandwidth allocation for the particular associated link. In a specific embodiment, the bandwidth map is stored in memory subsystem 44 of MCS 26. The bandwidth map may be updated by programming modules and data constructs stored in memory subsystem 44 and executed by processor 42 or by other subsystems of MCS 26.

Figure 4:
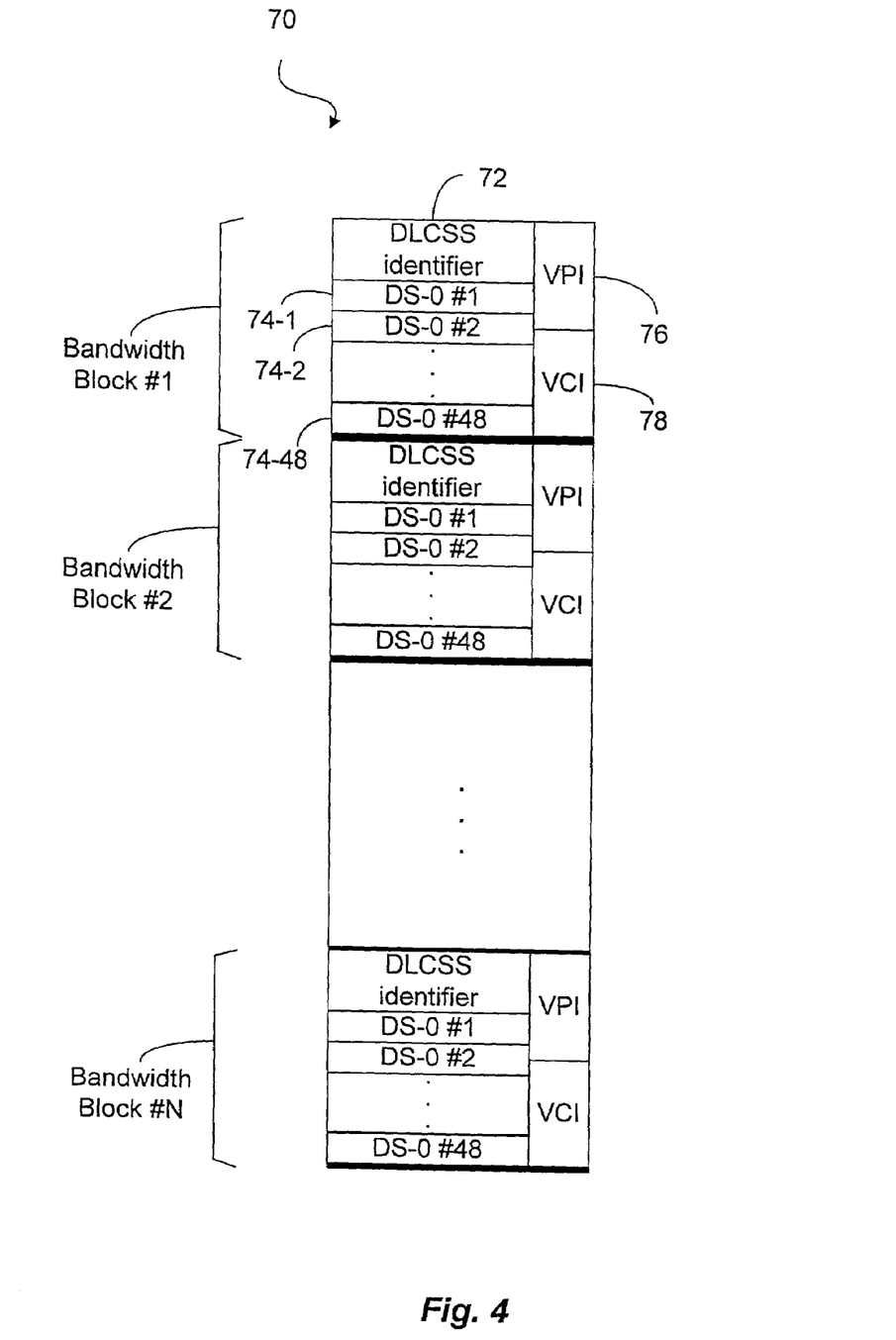
FIG. 4 depicts a control data structure implementing the bandwidth map stored in the memory subsystem of a DLCSS for each link supported by the DLCSS according to an embodiment of the invention.

FIG. 4 depicts a specific embodiment of bandwidth map 70 which is stored by a DLCSS for each link connected to the DLCSS. As shown, bandwidth map 70 comprises a plurality of bandwidth blocks. Each bandwidth block corresponds to an ATM cell and determines the bandwidth and switching parameters for the ATM cell. Each bandwidth block may contain several sub-fields including a DLCSS identifier field 72, 48 DS-0 indicators 74-1 through 74-48, a VPI field 76, and a VCI field 78.

DLCSS identifier field 72 stores an identifier identifying the subscriber DLCSS which is connected to the subscriber termination to be cross-connected to the network termination and to which the ATM cell corresponding to the bandwidth block is to be routed. For example, if a DLCSS bandwidth block were configured to support a cross connection between network termination 12-a and subscriber termination 14-a, as shown in FIG. 1, DLCSS identifier field 72 would store the identifier of DLCSS 16-c. The DLCSS identifier is assigned dynamically at cross-connection time and supplied by NMS 18. Once a DLCSS identifier has been assigned to a bandwidth block, all the DS-0s within that bandwidth block are exclusively assigned to the DLCSS identified by the DLCSS identifier and cannot be assigned to another DLCSS. This allows TDM traffic, represented by the 48 DS-0s in the ATM cell, to be routed from a network termination to a subscriber termination without needing TDM switching through the time-slot interchange (TSI) at the intermediate DLCSSs.

There are typically 48 DS-0 indicators in each bandwidth block corresponding to 48 DS-0s supported by an ATM cell, wherein each DS-0 is 1 byte (or 8 bits) wide. The DS-0 indicators are generally one bit values and indicate whether the corresponding DS-0 in an ATM cell has been allocated for transmission. Thus, in a specific embodiment a DS-0 indicator #22 having a bit value of "1" may indicate that DS-0 #22 in the ATM cell has been allocated.

The use of VPI and VCI values is well known to those skilled in the art. According to the ATM standard, each ATM communication link may be comprise a number of virtual paths (VPs), and each virtual path may in turn comprise a number of virtual channels (VCs). A VPI value indicates a particular virtual path within the physical communication link, while a VCI value indicates a particular virtual channel within the particular virtual path. VPI and VCI fields are present in the header of each ATM cell and in combination identify the virtual connection to which the cell belongs. Multiplexing and switching of ATM cells in an ATM network is done based on the VPI and VCI values. The VPI 76 and VCI 78 fields of each bandwidth block store VPI and VCI values identifying the virtual connection for transporting the ATM cell corresponding to the bandwidth block. The VPI and VCI values are assigned dynamically at cross-connection time. If the link is a TDM link, a null value is assigned to the VPI and VCI fields. In a specific embodiment, VCI field 78 may be 16 bits wide while VPI field 76 may be either 8 bits or 12 bits wide.

Figure 5:
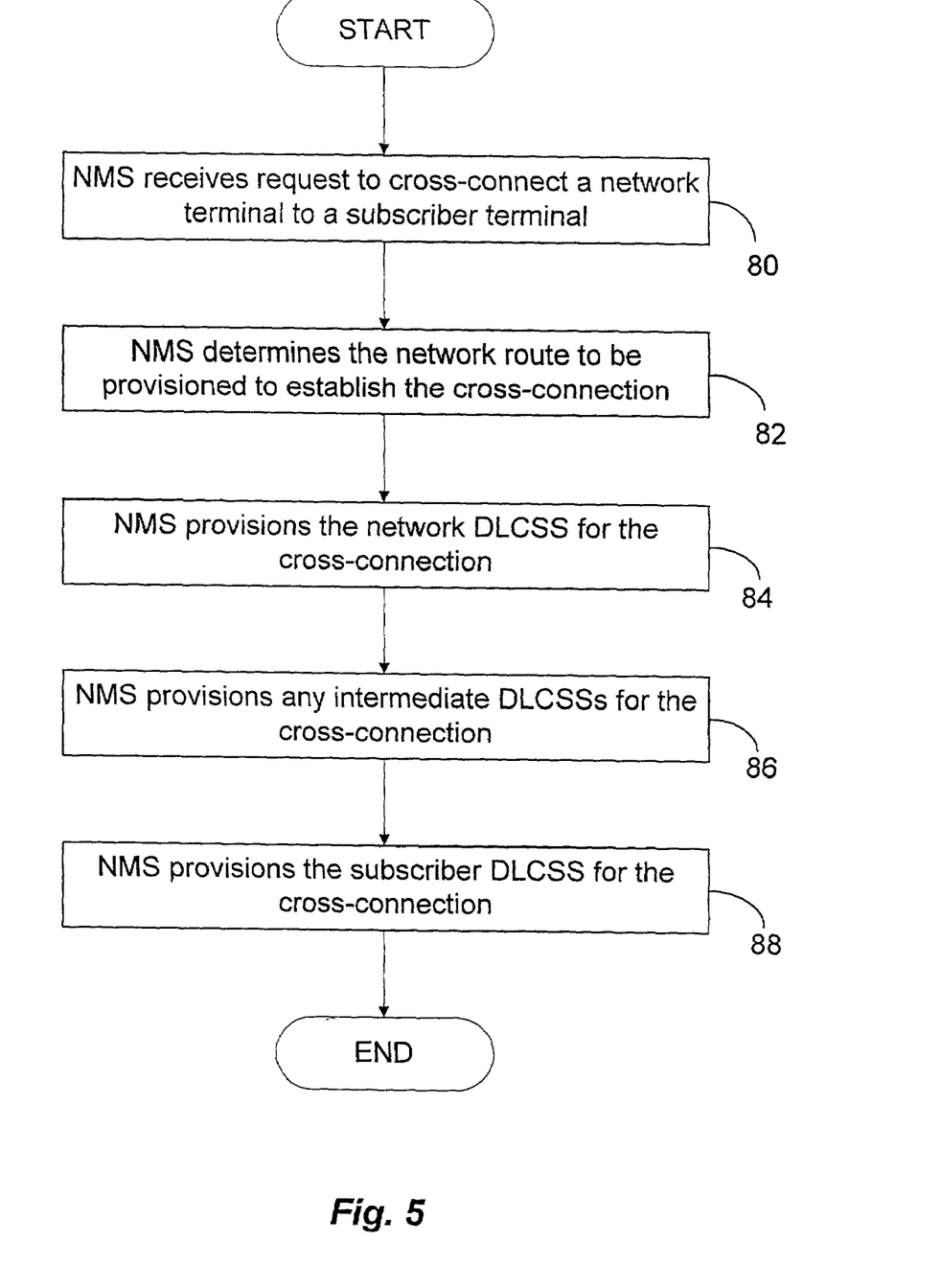
FIG. 5 is a flowchart depicting the steps for provisioning a cross-connection between network termination and subscriber termination according to an embodiment of the invention.

FIG. 5 is a flowchart depicting the steps for provisioning a ATM/TDM cross-connection between a network termination and a subscriber termination. The cross-connection provisioning is generally initiated when a NMS receives a request to cross-connect a particular network termination to a particular subscriber termination (step 80). For example, for the network depicted in FIG. 1, NMS 18 may receive a request to cross-connect network termination 12-a to subscriber termination 14-a.

NMS 18 then determines the network route, including intermediate links and DLCSSs, which have to be provisioned to establish the cross-connection (step 82). For a given network, it is possible that a plurality of network routes may exist between the network termination and the subscriber termination to be cross-connected. For example, for the network in FIG. 1, there are at least three network routes which connect network termination 12-*a* and subscriber termination 14-*a*. These include: (1) Network termination 12-*a*->link 20-*a*->DLCSS 16-*a*->link 20-*c*->DLCSS 16-*b*->link 20-*d*->DLCSS 16-*c*->link 20-*f*->Subscriber termination 14-*a*; (2) Network termination 12-*a*->link 20-*a*->DLCSS 16-*a*->link 20-*c*->DLCSS 16-*b*->link 20-*e*->DLCSS 16-*c*->link 20-*f*->Subscriber termination 14-*a*; and (3) Network termination 12-*a*->link 20-*a*->DLCSS 16-*a*->link 20-*c*->DLCSS 16-*b*->link 20-*h*->DLCSS 16-*d*->link 20-*i*->DLCSS 16-*c*->link 20-*f*->Subscriber termination 14-*a*. Where a plurality of network routes exist between the network termination and the subscriber termination, NMS 18 presents the available routes to the network provisioner/administrator and the network provisioner is then allowed to select a particular network route.

Figure 6:
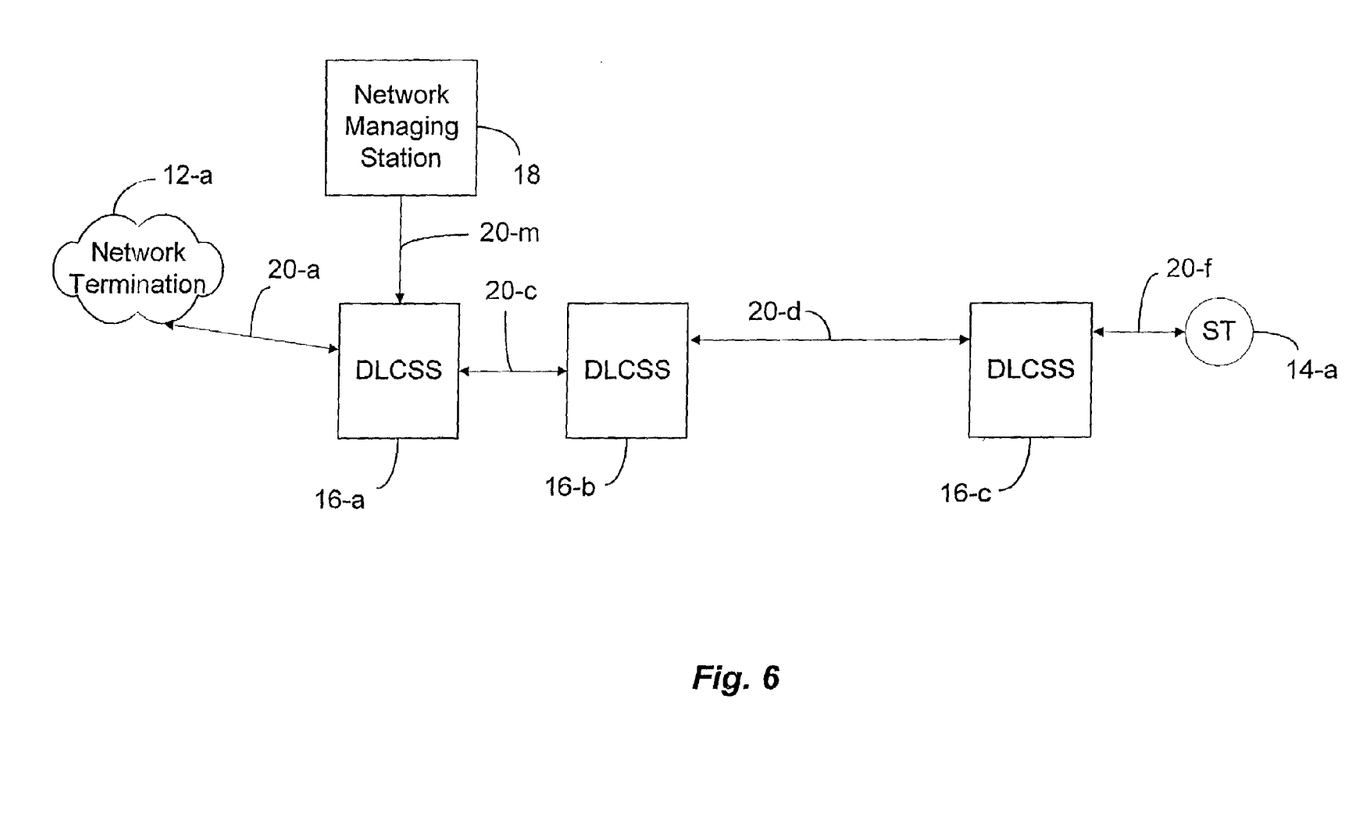
FIG. 6 is a block diagram depicting a subset of the DLC network depicted in FIG. 1, showing the network route to be provisioned to establish a cross-connection between a network termination and a subscriber termination.

Alternatively, if the network provisioner does not select a particular route, NMS 18 selects a specific network route by executing a "shortest route" algorithm. According to the "shortest route" algorithm, the network route with the smallest number of hops (or links traversed) is chosen. For example, for the network depicted in FIG. 1, routes (1) and (2) are chosen over route (3) which requires one additional hop. If two or more network routes have the same number of hops, the network route with the most available bandwidth is chosen. For example, route (1) is chosen over route (2) if route (1) has higher available bandwidth than route (2). Based on the selected route, NMS 18 then determines the links and DLCSSs to be provisioned to establish the cross-connection. FIG. 6 depicts a subset of the network depicted in FIG. 1, showing the network route to be provisioned to establish a cross-connection between network termination 12-*a* and subscriber termination 14-*a*. The network in FIG. 6 will be used to describe the remaining algorithm steps in FIG. 5.

Next, NMS 18 provisions network DLCSS 16-*a* for the cross-connection (step 84). The details of step 84 are illustrated in the flowchart depicted in FIG. 7. In a specific embodiment, NMS 18 sends a cross-connection message to network DLCSS 16-*a* requesting a connection between link 20-*a* and 20-*c*, along with information that DLCSS 16-*c* is the destination subscriber DLCSS (step 90). Bandwidth requirements for supporting the cross-connection are also communicated to DLCSS 16. Upon receiving the cross-connection request, MCS 26 within DLCSS 16-*a* consults the bandwidth map for link 20-*c* to determine if a bandwidth block has already been allocated for the destination DLCSS, i.e. for DLCSS 16-*c* (step 92). This is usually accomplished by checking the DLCSS identifier field in each of the allocated bandwidth blocks contained in the bandwidth map for link 20-*c*. Allocation of a bandwidth block implies that a corresponding ATM cell has been allocated for the destination DLCSS.

Figure 7:
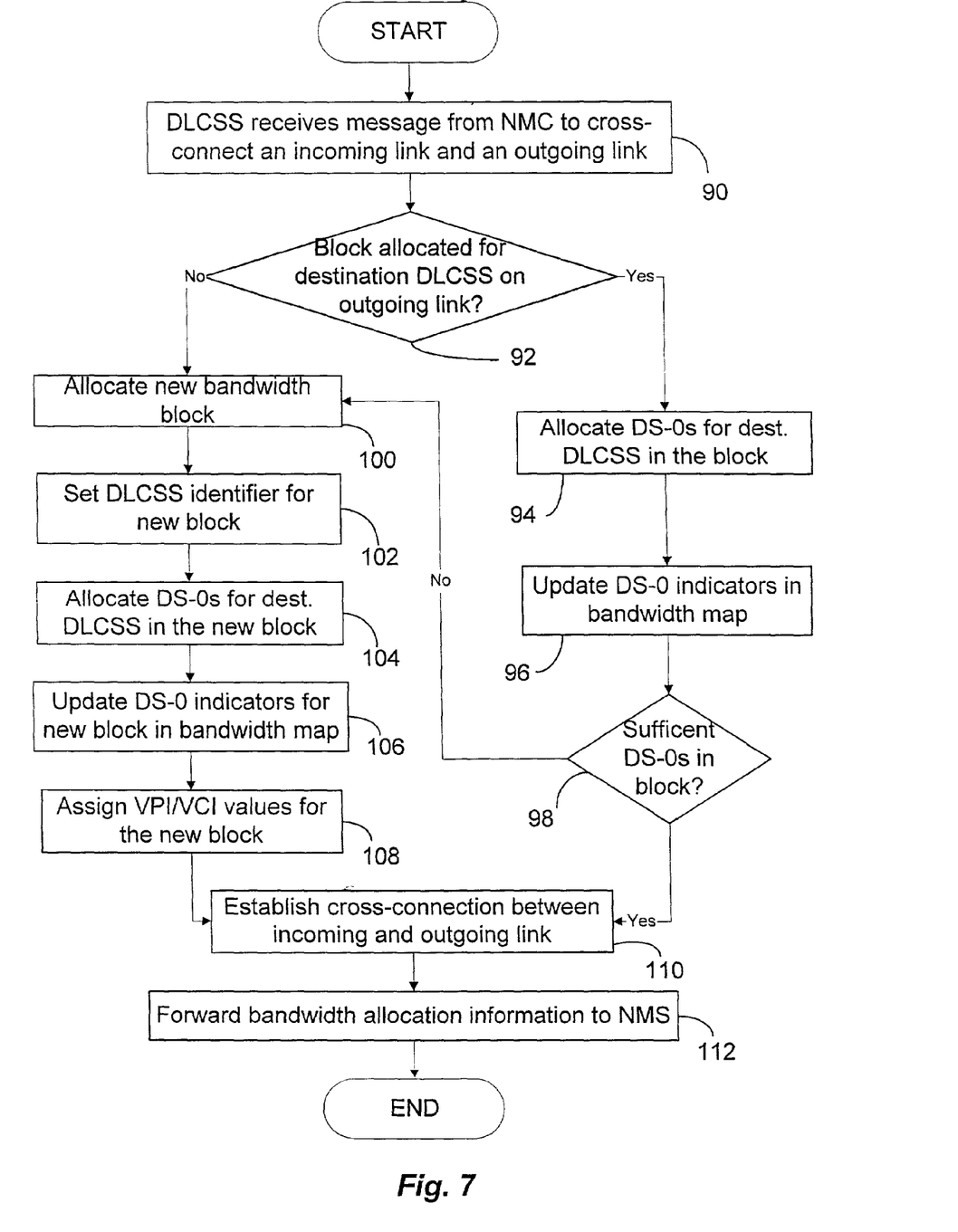
FIG. 7 is a flowchart depicting the steps for configuring a DLCSS to support the ATM/TDM cross-connection.

If a bandwidth block has not been previously allocated for the destination DLCSS, a new bandwidth block is allocated (step 100). This in turn allocates a new ATM cell for carrying the network traffic to the destination DLCSS. If a bandwidth block has already been allocated, MCS 26 allocates one or more unallocated DS-0s from the corresponding ATM cell, as indicated by the DS-0 indicators in the pre-allocated bandwidth block, are allocated to the destination DLCSS (step 94). The DS-0 indicators corresponding to the newly allocated DS-0s are modified to reflect the allocation (step 96). MCS 26 then determines if the allocation of DS-0s from the ATM cell corresponding to the pre-allocated bandwidth block was sufficient to satisfy the cross-connection bandwidth requirement (step 98). If additional bandwidth is required, a new bandwidth block and a corresponding ATM cell is allocated to satisfy the bandwidth requirement (step 100).

As previously stated, a new bandwidth block is allocated either if no bandwidth block has been previously allocated for the destination DLCSS, or there were insufficient DS-0s in the pre-allocated block to satisfy the cross-connection request. The DLCSS identifier for the newly allocated bandwidth block is set to the identifier of destination DLCSS 16-*c* (step 102). The requisite number of DS-0s are then allocated to the destination DLCSS and their corresponding DS-0 indicators modified to reflect the allocation (step 106). VPI and VCI values may also assigned to the newly allocated block (step 108). Link 20-*a* is then cross-connected to link 20-*c* via TSI (step 110). If the number of DS-0s required for the cross-connection cannot be allocated by the particular link, the DLCSS notifies NMS 18 that the cross-connection cannot be established for lack of bandwidth.

After network DLCSS 16-*a* establishes a cross-connection between link 20-*a* and 20-*c*, the bandwidth allocation information for link 20-*c* is forwarded to NMS 18 (step 112). This information includes but is not limited to: the bandwidth block number allocated for the connection and the DS-0s allocated for the connection (may be encapsulated in the form of an absolute DS-0 value), and VPI and VCI values assigned to link 20-*c*.

NMS 18 then sends a cross-connection request to the next DLCSS in the network route (step 86). This information usually includes: links that are to be cross-connected, bandwidth allocation information from the previously provisioned DLCSS, and the destination DLCSS identifier. For example, a cross-connection request is sent to intermediate DLCSS 16-*b* along with information including: request for connecting links 20-*c* and 20-*d*, bandwidth allocation data for link 20-*c* received from network DLCSS 16-*a*, and the destination DLCSS 16-*c* identifier.

On receiving the connection request from NMS 18, intermediate DLCSS 16-*b* looks up the bandwidth map for link 20-*c* and updates the bandwidth allocation for link 20-*c* as per bandwidth allocation for that same link received from DLCSS 16-*a*. Since link 20-*c* is managed by both network DLCSS 16-*a* and DLCSS 16-*b*, the bandwidth allocation or bandwidth map information for the link is identical.

DLCSS 16-*b* then follows the same series of steps shown in FIG. 7 for establishing a cross-connection between links 20-*c* and 20-*d*. After DLCSS 16-*b* establishes a cross-connection between links 20-*c* and 20-*d*, the bandwidth allocation information for link 20-*d* is forwarded to NMS 18 (step 112). This information includes but is not limited to: the bandwidth block number allocated for the connection and the DS-0s allocated for the connection (may be encapsulated in the form of an absolute DS-0 value), and VPI and VCI values assigned to link 20-*d*. Step 86 is then repeated for all intermediate DLCSSs in the network route between the network termination and the subscriber termination.

After all the intermediate DLCSSs have been provisioned, NMS 18 then sends a cross-connection request along with bandwidth allocation information for the previous DLCSS to the subscriber DLCSS for establishing the cross-connection (step 88). For example, a connection request is sent by NMS 18 to subscriber DLCSS 16-*c* along with information including: request for connecting links 20-*d* and 20-*f*, bandwidth allocation information for link 20-*d* received from network DLCSS 16-*b*, the destination subscriber terminal 14-*a*, and the destination DLCSS 16-*c* identifier.

Upon receiving the cross-connection request, subscriber DLCSS 14-*a* programs the ATM switch in MCS 26 to cross-connect links 20-d and 20-f to subscriber termination 14-a. This completes the cross-connection between network termination 12-a and subscriber termination 14-a. Since every DS-0 in an ATM cell has a destination which is known to be the same DLCSS, the ATM cell is passed directly to the destination DLCSS without need for further TDM switching at the DS-0 level. In this manner, TDM traffic encapsulated in ATM cells may be transported from the network termination to the subscriber termination without having to perform TDM switching at the intermediate DLCSSs (or nodes).

The present invention presents several advantages over conventional techniques for cross-connecting TDM networks and ATM networks. Since each DLCSS in the network route between the network termination and the subscriber termination keeps track of the destination subscriber DLCSS, and further since each ATM cell is assigned to a particular destination, i.e. all the DS-0s in the cell have a common destination DLCSS, the ATM cell carrying the TDM traffic does not need to be switched at intermediate nodes or DLCSSs. This reduces the switching time required by conventional switches for switching TDM traffic in ATM networks. Reduced switching time translates to faster services being provided to subscribers. Further, the present invention discloses a simple and efficient method and system for provisioning ATM/TDM cross-connections via a network managing station. The station also allows for efficient bandwidth management for the ATM/TDM cross-connection. Several other advantages of the present invention will be apparent to one of ordinary skill in the art.

Although the invention has been explained with reference to specific embodiments, other embodiments will be evident to those of ordinary skill in the art. It is therefore not intended that this invention be limited except as indicated by the appended claims.

CONCLUSION

A method and system for establishing cross-connections between TDM and ATM networks and providing switching and bandwidth management facilities for the ATM/TDM cross-connection in a digital loop carrier (DLC) network. TDM traffic is encapsulated in ATM cells and transported from network terminations to subscriber terminations in a digital loop via a plurality of digital loop carrier switching systems (DLCSSs). The DLCSSs are configured such that TDM traffic encapsulated in ATM cells may be transported from the network termination to the subscriber termination without having to perform TDM switching at the intermediate DLCSSs.

Although specific embodiments of the invention have been described, various modifications, alterations, alternative constructions, and equivalents are also encompassed within the scope of this invention. For example, the described invention is not restricted to operation within certain specified computer environments, but is free to operate within a plurality of computer environments. Additionally, although the present invention has been described using a particular series of transactions between the various network components, it should be apparent to those skilled in the art that the scope of the present invention is not limited to the described series of transactions.

While the present invention has been described using a particular combination of hardware and software, it should be recognized that other combinations of hardware and software are also within the scope of the present invention.

For example, the functions performed by the NMS and the DLCSS may be performed by software modules executed by processors in the NMS and DLCSS, respectively. Alternatively, the present invention may be implemented only in hardware or only in software, or a combination of hardware and software or in combinations with other hardware and software elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for transporting synchronous network traffic across an asynchronous transfer mode (ATM) network, comprising:
    receiving a network request for a cross-connection at a switching node in an ATM network, the network request comprising a destination identifier specifying a destination switching node and further comprising bandwidth requirements for supporting the cross-connection;
    retrieving from memory bandwidth allocation information for the switching node, the bandwidth allocation information specifying a plurality of bandwidth blocks;
    allocating one or more bandwidth blocks for the cross-connection;
    updating the bandwidth allocation information to reflect the allocated bandwidth blocks;
    updating the bandwidth allocation information to include the destination switching node;
    receiving an ATM cell comprising header bytes, information storage bytes and synchronous network traffic stored in the information storage bytes; and
    communicating the ATM cell using the bandwidth allocation information without individually switching the information storage bytes.

2. The method of claim 1, wherein the ATM cell is one of a plurality of ATM cells and the method further comprises:
    receiving the synchronous network traffic from a network termination of a synchronous network; and
    storing the synchronous network traffic in the information storage bytes of one or more of the plurality of ATM cells.

3. The method of claim 1, further comprising:
    determining if sufficient bandwidth blocks are available for the bandwidth requirements of the cross-connection; and
    if not enough of the bandwidth blocks are available, communicating a network response to a network managing station indicating that not enough of the bandwidth blocks are available, and waiting until sufficient bandwidth blocks become available before allocating the one or more bandwidth blocks to the cross-connection.

4. The method of claim 1, wherein the bandwidth allocation information describes allocated bandwidth and available bandwidth for a plurality of switching nodes.

5. The method of claim 1, wherein:
    the synchronous network traffic stored in the information storage bytes of the ATM cell comprises a plurality of DS-0s; and
    each DS-0 in the ATM cell is associated with the destination identifier.

6. The method of claim 1, wherein the bandwidth allocation information comprises:
 the destination identifier;
 a virtual path identifier (VPI);
 a virtual channel identifier (VCI); and
 a selected bandwidth block identifier allocated to the ATM cell.

7. Software embodied in a computer readable medium and operable to perform the following steps:
 receiving a network request for a cross-connection at a switching node in an ATM network, the network request comprising a destination identifier specifying a destination switching node and further comprising bandwidth requirements for supporting the cross-connection;
 retrieving from memory bandwidth allocation information for the switching node, the bandwidth allocation information specifying a plurality of bandwidth blocks;
 allocating one or more bandwidth blocks for the cross-connection;
 updating the bandwidth allocation information to reflect the allocated bandwidth blocks;
 updating the bandwidth allocation information to include the destination switching node;
 receiving an ATM cell comprising header bytes, information storage bytes and synchronous network traffic stored in the information storage bytes; and
 communicating the ATM cell using the bandwidth allocation information without individually switching the information storage bytes.

8. The software of claim 7, wherein the ATM cell is one of a plurality of ATM cells and the method further comprises:
 receiving the synchronous network traffic from a network termination of a synchronous network; and
 storing the synchronous network traffic in the information storage bytes of one or more of the plurality of ATM cells.

9. The software of claim 7, further comprising:
 determining if sufficient bandwidth blocks are available for the bandwidth requirements of the cross-connection; and
 if not enough of the bandwidth blocks are available, communicating a network response to a network managing station indicating that not enough of the bandwidth blocks are available, and waiting until sufficient bandwidth blocks become available before allocating the one or more bandwidth blocks to the cross-connection.

10. The software of claim 7, wherein the bandwidth allocation information describes allocated bandwidth and available bandwidth for a plurality of switching nodes.

11. The software of claim 7, wherein:
 the synchronous network traffic stored in the information storage bytes of the ATM cell comprises a plurality of DS-0s; and
 each DS-0 in the ATM cell is associated with the destination identifier.

12. The software of claim 7, wherein the bandwidth allocation information comprises:
 the destination identifier;
 a virtual path identifier (VPI);
 a virtual channel identifier (VCI); and
 a selected bandwidth block identifier allocated to the ATM cell.

13. A system for transporting synchronous network traffic across an asynchronous transfer mode (ATM) network, comprising:
 means for receiving a network request for a cross-connection at a switching node in an ATM network, the network request comprising a destination identifier specifying a destination switching node and further comprising bandwidth requirements for supporting the cross-connection;
 means for retrieving from memory bandwidth allocation information for the switching node, the bandwidth allocation information specifying a plurality of bandwidth blocks;
 means for allocating one or more bandwidth blocks for the cross-connection;
 means for updating the bandwidth allocation information to reflect the allocated bandwidth blocks;
 means for updating the bandwidth allocation information to include the destination switching node;
 means for receiving an ATM cell comprising header bytes, information storage bytes and synchronous network traffic stored in the information storage bytes; and
 means for communicating the ATM cell using the bandwidth allocation information without individually switching the information storage bytes.

14. A method for establishing a cross-connection for synchronous network traffic transported in an asynchronous transfer mode (ATM) network, comprising:
 determining a network path for a cross-connection, the network path comprising a first switching node and a second switching node;
 storing bandwidth allocation information for the first and second switching nodes;
 communicating a first network request for the cross-connection to the first switching node, the first network request comprising a destination identifier specifying a destination switching node and further comprising bandwidth requirements for the cross-connection;
 receiving, in response to the first network request, updated bandwidth allocation information for the first switching node;
 updating the stored bandwidth allocation information for the first switching node; and
 communicating a second network request for the cross-connection to the second switching node, the second network request comprising the destination identifier, the bandwidth requirements for the cross-connection, and the updated bandwidth allocation information for the first switching node.

15. The method of claim 14, wherein determining the network path for the cross-connection comprises:
 determining a plurality of network paths from an origination to a destination, each network path specifying one or more switching nodes and each network path having sufficient bandwidth to support the cross-connection;
 selecting from the plurality of network paths one or more shortest network paths comprising a least number of switching nodes; and
 selecting from the one or more shortest network paths the shortest network path having the highest bandwidth.

16. The method of claim 14, wherein the method further comprises:
 receiving a network response indicating that insufficient bandwidth is available for the cross-connection; and
 selecting an alternative network path for the cross-connection.

17. The method of claim 14, wherein the steps are performed at a network managing station.

18. Software embodied in a computer readable medium and operable to perform the following steps:

determining a network path for a cross-connection, the network path comprising a first switching node and a second switching node;

storing bandwidth allocation information for the first and second switching nodes;

communicating a first network request for the cross-connection to the first switching node, the first network request comprising a destination identifier specifying a destination switching node and further comprising bandwidth requirements for the cross-connection;

receiving, in response to the first network request, updated bandwidth allocation information for the first switching node;

updating the stored bandwidth allocation information for the first switching node; and communicating a second network request for the cross-connection to the second switching node, the second network request comprising the destination identifier, the bandwidth requirements for the cross-connection, and the updated bandwidth allocation information for the first switching node.

19. The software of claim 18, wherein determining the network path for the cross-connection comprises:

determining a plurality of network paths from an origination to a destination, each network path specifying one or more switching nodes and each network path having sufficient bandwidth to support the cross-connection;

selecting from the plurality of network paths one or more shortest network paths comprising a least number of switching nodes; and selecting from the one or more shortest network paths the shortest network path having the highest bandwidth.

20. The software of claim 18, wherein the method further comprises receiving a network response indicating that insufficient bandwidth is available for the cross-connection; and selecting an alternative network path for the cross-connection.

* * * * *